United States Patent
Zhang et al.

(10) Patent No.: US 8,640,542 B2
(45) Date of Patent: Feb. 4, 2014

(54) CANTILEVER BEAM STRUCTURAL RESONANT-TYPE INTEGRATED OPTICAL WAVEGUIDE ACCELEROMETER

(75) Inventors: Tong Zhang, Nanjing (CN); Xiaojun Xue, Nanjing (CN); Xiaoyang Zhang, Nanjing (CN); Pengqin Wu, Nanjing (CN)

(73) Assignee: Southeast University (CN)

( * ) Notice: Subject to any disclaimer, the term of this patent is extended or adjusted under 35 U.S.C. 154(b) by 238 days.

(21) Appl. No.: 13/202,755

(22) PCT Filed: Sep. 23, 2009

(86) PCT No.: PCT/CN2009/074144
§ 371 (c)(1),
(2), (4) Date: Aug. 22, 2011

(87) PCT Pub. No.: WO2010/094190
PCT Pub. Date: Aug. 26, 2010

(65) Prior Publication Data
US 2011/0303008 A1  Dec. 15, 2011

(30) Foreign Application Priority Data

Feb. 23, 2009 (CN) .......................... 2009 1 0024475

(51) Int. Cl.
*G01P 15/08* (2006.01)
(52) U.S. Cl.
USPC ........................................................ 73/514.26
(58) Field of Classification Search
USPC ................. 73/514.26, 514.27, 514.19, 653
See application file for complete search history.

(56) References Cited

U.S. PATENT DOCUMENTS

| | | | | |
|---|---|---|---|---|
| 4,613,752 A | * | 9/1986 | Davis | 250/227.19 |
| 4,900,918 A | * | 2/1990 | Killian | 73/514.27 |
| 5,276,322 A | | 1/1994 | Carome | |
| 5,313,266 A | * | 5/1994 | Keolian et al. | 356/477 |
| 5,345,522 A | * | 9/1994 | Vali et al. | 385/24 |
| 5,420,688 A | * | 5/1995 | Farah | 356/477 |

(Continued)

FOREIGN PATENT DOCUMENTS

| CN | 1209553 A | 3/1999 |
|---|---|---|
| CN | 1693899 A | 11/2005 |

(Continued)

OTHER PUBLICATIONS

International Search Report, dated Dec. 24, 2009, corresponding to PCT/CN2009/074144, 6 pages.

*Primary Examiner* — Helen Kwok
(74) *Attorney, Agent, or Firm* — Christie, Parker & Hale, LLP

(57) ABSTRACT

A cantilever beam structural resonant-type integrated optical waveguide accelerometer, includes an input waveguide (1), a dissymmetrical structural Mach-Zehnder interferometer (2), a micro-mechanical vibration cantilever beam (3), a short curved waveguide (4) and an output waveguide (5); all the waveguide structures and the cantilever beam use the integrated optical micromachining technique, and the device single-scale integration can be realized by using the temperature-insensitive organic polymer optical waveguide structure and the organic polymer substrate, the key technique indexes such as detection sensitivity, dynamic range are extensively adjusted. The phase difference of the optical signal can be measured by detecting the optical intensity of the resonant frequency of the optical circuit so as to achieve high sensitive acceleration detection, and to be free from the effect of the ambient temperature disturbance and waveguide birefringence.

3 Claims, 4 Drawing Sheets

(56) References Cited

U.S. PATENT DOCUMENTS

| | | | |
|---|---|---|---|
| 5,926,591 A * | 7/1999 | Labeye et al. | 385/25 |
| 6,026,209 A | 2/2000 | Rhee et al. | |
| 6,240,226 B1 * | 5/2001 | Presby et al. | 385/42 |
| 6,525,307 B1 * | 2/2003 | Evans et al. | 250/227.16 |
| 6,529,659 B2 * | 3/2003 | Little et al. | 385/37 |
| 7,003,186 B2 * | 2/2006 | Bell et al. | 385/15 |
| 7,518,731 B2 * | 4/2009 | Li | 356/482 |
| 2006/0279835 A1 | 12/2006 | Otsubo et al. | |

FOREIGN PATENT DOCUMENTS

| | | | |
|---|---|---|---|
| CN | 101482575 A | | 7/2009 |
| JP | 11-083894 | * | 3/1999 |
| JP | 2000-276920 | | 10/2000 |

* cited by examiner

CANTILEVER BEAM STRUCTURAL RESONANT-TYPE INTEGRATED OPTICAL WAVEGUIDE ACCELEROMETER

CROSS-REFERENCE TO RELATED APPLICATION(S)

This application is a National Phase Patent Application and claims the priority to and benefit of International Application Number PCT/CN2009/074144, filed on Sep. 23, 2009, which claims priority of Chinese Patent Application Number 200910024475.3, filed on Feb. 23, 2009.

FIELD OF THE INVENTION

The present invention relates to the field of integrated optics and sense technology, particularly relates to a cantilever beam structural resonant-type integrated optical waveguide accelerometer, and more particularly relates to a monolithically integrated accelerometer with high sensitivity.

BACKGROUND OF THE INVENTION

An accelerometer is an important test component in inertial navigation, inertial guidance, and control testing devices. Both inertial navigation and inertial guidance utilizes the accelerometer's sensitivity to test the movement acceleration of the carrier. Nowadays, accelerometers are widely applied to aviation, navigation, astronavigation, earthquake detection, and precise guidance and control. There are various accelerometers, including pendulum accelerometers, flexure accelerometers, electromagnetic accelerometers, MEMS accelerometers, and optical accelerometers, etc.

Optical accelerometers have many advantages such as resistance to electromagnetic interference, high sensitivity, high SNR (signal to noise ratio), and high stability, etc., and as such, have been a focus of major research directions in the field of accelerometers in recent years. The detection principle of an optical accelerometer is as follows: since the optical signals in the sensitive element (mass block) are modulated by the acceleration to be measured, the optical properties (e.g., optical intensity, phase, or resonant frequency) of the optical signals which are received by an optical detector after being transmitted, reflected, or interfered in the optical circuit are changed; and then the optical signals are fed into a photoelectric detector to obtain the measured physical quantities by means of appropriate demodulation technologies. At present, optical accelerometers that are mainly studied include phase modulation accelerometers and frequency (wavelength) modulation accelerometers. Phase modulation optical accelerometers detect the value of acceleration by detecting the phase change of transmitted light which is caused due to the action of inertial force on the optical sensing element (e.g., optical fiber). Such accelerometers usually have an optical structure such as a Michelson, Maeh-Zehnder, or Fabry-Perot chamber, and detect acceleration by detecting the change of optical intensity after the signal light interferes with the reference light. A main drawback of such accelerometers is if the phase difference between the two optical signals is small, then the change of optical intensity is not obvious, and therefore the detection sensitivity is not high. Frequency modulation optical accelerometers are developed on the basis of phase modulation optical accelerometers. They employ special device structures with periodic frequency selection function, such as optical grating, fiber grating, and resonant ring, etc., and utilize the relation between resonant frequency and inertial force to detect acceleration. When the sensitive element to be measured produces inertial force or displacement during accelerated movement, the displacement of the optical path system at the resonant frequency will change. The value of acceleration can be obtained by measuring the horizontal displacement at the resonant frequency. Since the subtle change in phase difference of signal light is further amplified by enhancement of multiple-beam interference, the detection sensitivity is higher. However, due to the effect of environmental temperature fluctuations and double refraction of waveguide, the resonant spectral lines have horizontal displacement and asymmetrical distribution, which result in severe degradation of detection sensitivity of the device.

According to the system constitution of elements and devices, the optical sensing elements and optical transmission path of existing optical accelerometers are mainly composed of discrete devices such as optical fiber, optical grating, fiber grating, reflector, etc., which have large size, high production cost, and poor system stability, etc. Moreover, optical fiber devices are sensitive to temperature fluctuations, and the splicing loss and polarization effect of optical fiber devices will influence the stability and detection sensitivity of the accelerometer.

The development of technology of integrated optical devices brings a new developing trend to optical sensors. With micro-nano precision machining technology, various optical elements and devices can be integrated on the same substrate, and the discrete functional elements and devices can be connected through optical waveguides, so as to further reduce the size of the optical sensor system. In addition, integrated optical devices have advantages such as high stability, high reliability, simple production process, and more available materials, etc., and can meet the technical demand for development of high-precision optical acceleration sensors. In recent years, full-polymer optical waveguide devices, comprising substrate, cladding and core layer which are made of organic polymer materials, has been a popular focus for research. Optical waveguides having such a structure are insensitive to temperature fluctuations; in addition, since the substrate is made of organic polymer material, it has advantages such as lower elastic modulus, higher sensitivity to stress and strain, higher toughness, and high resistance to fracture, etc., over conventional silicon wafer or quartz substrate, and can be applied to develop high-precision mechanical sensors.

SUMMARY OF THE INVENTION

Technical Challenge

To overcome the drawbacks in the prior art, the present invention provides a cantilever beam structural resonant-type integrated optical waveguide accelerometer, which employs organic polymer optical waveguides to form the cantilever beam structure, and utilizes an innovative waveguide structure and detection principle to implement a high-precision monolithically integrated optical accelerometer chip having advantages such as high detection precision, small size, simple production process, and easy implement for mass production, etc.

Technical Solution

The technical solution of the present invention is implemented as follows: according to the structure, the accelerometer put forth in the present invention comprises an input waveguide, an asymmetric Mach-Zehnder interferometer, a micro mechanical vibration cantilever beam, a short curved waveguide, and an output waveguide, wherein, the input waveguide, asymmetric Mach-Zehnder interferometer, micro mechanical vibration cantilever beam, short curved waveguide, and output waveguide all comprise an organic polymer substrate, an organic polymer waveguide core layer, and an organic polymer waveguide cladding; the inner ends of a first 2×2-port directional coupler are respectively connected to a first short waveguide and one end of the curved waveguide, the inner ends of a second 2×2-port directional coupler are respectively connected to a second short waveguide and the other end of the curved waveguide, and a phase modulator is connected between the first short waveguide and the second short waveguide, forming a Mach-Zehnder interferometer with asymmetric structure; the input waveguide, short curved waveguide, output waveguide, the first 2×2-port directional coupler, the first short waveguide, the phase modulator, the second short waveguide, and the second 2×2-port directional coupler are fixed on a base; the outer ends of the first 2×2-port directional coupler are respectively connected to the input waveguide and one end of a long curved waveguide, the outer ends of the second 2×2-port directional coupler are respectively connected to the output waveguide and the other end of the long curved waveguide, and the long curved waveguide is integrated on the micro mechanical vibration cantilever beam; and the micro mechanical vibration cantilever beam has a twin-beam structure, which is formed through the connection of two parallel and symmetrically distributed micro cantilever beams and a mass block, wherein, one end of the micro cantilever beam is fixed on the base and the other end of the micro cantilever beam is connected with the mass block which is hung freely in the air, and the plane of the organic polymer waveguide core layer is above the neutral plane of the micro cantilever beam.

The micro cantilever beam of the accelerometer provided in the present invention comprises an organic polymer substrate, an organic polymer waveguide core layer, and an organic polymer waveguide cladding, wherein, the organic polymer waveguide core layer has a rectangular structure with thickness and width at micron level; the organic polymer waveguide cladding and organic polymer substrate have a same width within 20-1,000 μm; the organic polymer waveguide cladding has a thickness of 10-20 μm; and the organic polymer substrate has a thickness of 20-1,000 μm.

The detection principle of the accelerometer provided in the present invention is as follows: the optical signals are fed through the input waveguide into a closed optical circuit composed of the asymmetric Mach-Zehnder interferometer and short curved waveguide, and produce multi-beam interference; then the interfered optical signals are output by the output waveguide to an optical detector and a peripheral detecting circuit, where the optical signals are demodulated. The acceleration is detected by measuring the change of optical intensity at the resonant frequency and the phase difference of optical signals resulting from acceleration.

Beneficial Effects

Compared to the prior art, the present invention has the following advantages:

1. The accelerometer provided in the present invention utilizes integrated optical device processing technologies, and employs organic polymer optical waveguide structures that are insensitive to temperature fluctuations to produce all sensing structures including optical waveguide elements, substrates, and micro mechanical vibration cantilever beams, etc., thus monolithic integration of the devices is achieved. Compared to conventional optical fiber sensors and inorganic integrated optical sensors, the key technical parameters (e.g., elastic coefficient, detection sensitivity, and dynamic range, etc.) of the accelerometer provided in the present invention can be adjusted in a wide range, and the device has advantages such as small size, light weight, high stability, simple production process, can be produced by mass production, and can reduce costs significantly.

2. In terms of the detection principle, compared to the existing phase modulation or frequency modulation optical accelerometers in the prior art, the accelerometer provided in the present invention detects acceleration by measuring the change of optical intensity at the resonant frequency and the phase difference of optical signals resulting from acceleration. Since the signal light is always at the resonant frequency during the testing process, the accelerometer provided in the present invention has much higher detection sensitivity, and is insusceptible to environmental temperature fluctuations and double refraction of waveguides.

EMBODIMENTS

Hereinafter the technical solution of the present invention will be further described in conjunction with the accompanying drawings.

Figure 1:
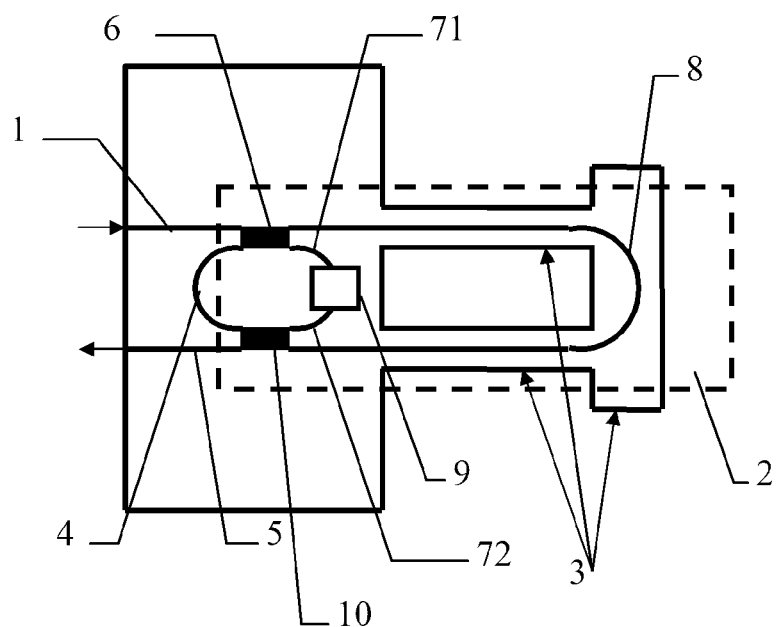
FIG. 1 is a top view of the structure of a cantilever beam structural resonant-type integrated optical waveguide accelerometer of the present invention.

The structure of the cantilever beam structural resonant-type integrated optical waveguide accelerometer of the present invention is shown in FIG. 1. The optical signal channel comprises: an input waveguide 1, an asymmetric Mach-Zehnder interferometer 2, a short curved waveguide 4, an output waveguide 5, an asymmetric Mach-Zehnder interferometer 2, and a short curved waveguide 4, wherein, the asymmetric Mach-Zehnder interferometer 2 comprises a first 2×2-port directional coupler 6, a short waveguide 71, a phase modulator 9, a short waveguide 72, a long curved waveguide 8, and a second 2×2-port directional coupler 10. The input waveguide 1, short curved waveguide 4, output waveguide 5, first 2×2-port directional coupler 6, short waveguide 71, phase modulator 9, short waveguide 72, and second 2×2 port directional coupler 10 in the accelerometer chip, are fixed on a base 11, respectively.

Figure 2:
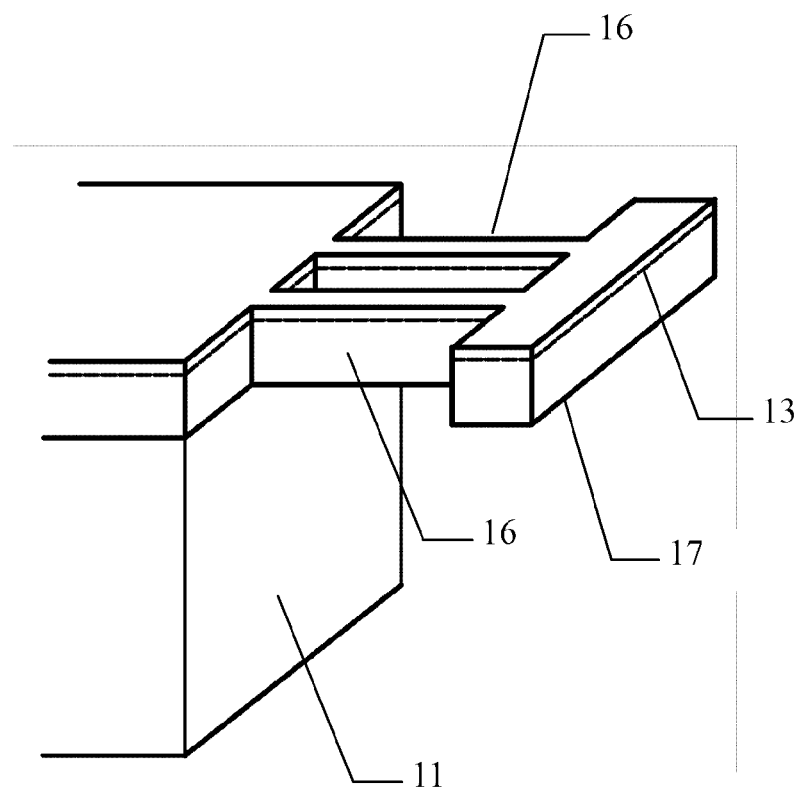
FIG. 2 is a structure diagram of the micro mechanical vibration cantilever beam of the present invention.
Figure 3:
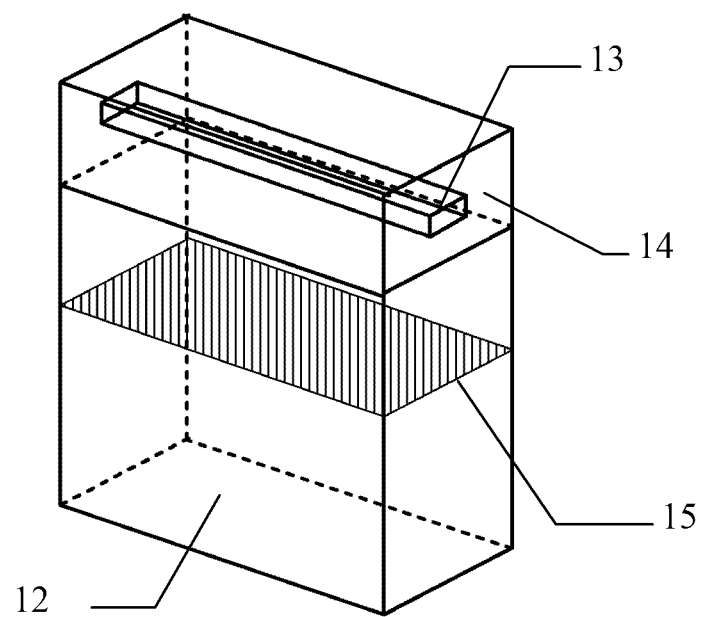
FIG. 3 is a structure diagram of the micro cantilever beam.
Figure 4:
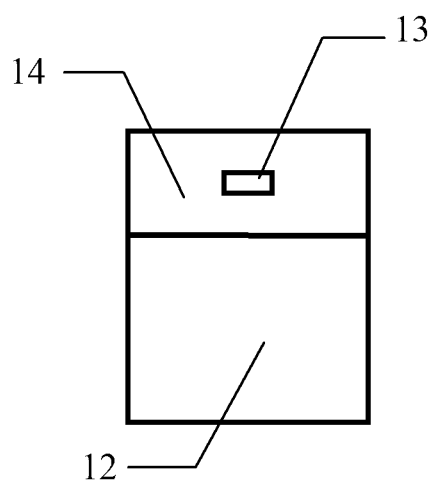
FIG. 4 is a structure diagram of the section of the micro cantilever beam perpendicular to the waveguide transmission direction.
Figure 5:
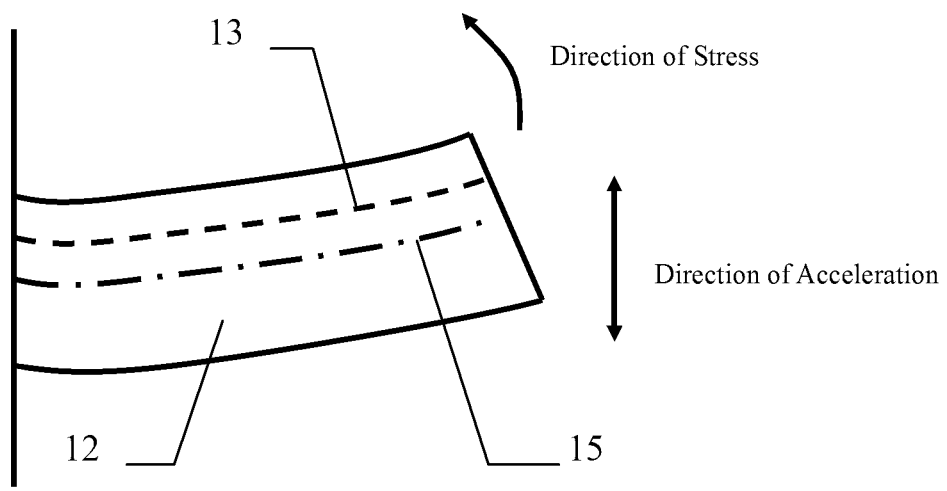
FIG. 5 is a structure diagram of the section of the micro cantilever beam parallel to the waveguide transmission direction.

The substrate area where the long curved waveguide 8 is located, is treated with micro-machining technology to remove part organic polymer substrate and cladding, and to produce the micro-cantilever beam 16 and mass block 17, which together form the sensitive element of accelerometer— the micro mechanical vibration cantilever beam 3. The structure of the micro mechanical vibration cantilever beam 3 is shown in FIG. 2: the micro mechanical vibration cantilever beam 3 has a twin-beam structure, comprising two parallel and symmetrically distributed micro-cantilever beams 16 and a mass block 17, wherein, one end of the micro mechanical vibration cantilever beam 3 is fixed on the base 11, and the other end is hung freely in the air. The structure of the micro-cantilever beam 16 is shown in FIGS. 3 and 4. The micro-cantilever beam 16 comprises an organic polymer substrate 12, an organic polymer waveguide core layer 13, and an organic polymer waveguide cladding 14, wherein, the organic polymer waveguide core layer 13 has a rectangular structure with thickness and width at micron level; the organic polymer waveguide cladding 14 and organic polymer substrate 12 have a same width within 20-1,000 μm; the organic polymer waveguide cladding 14 has a thickness of 10-20 μm; and the organic polymer substrate 12 has thickness of 20-1,000 μm. The waveguide core layer 13 of the long curved waveguide 8 is in a plane above the neutral plane of the micro-cantilever beam 16, as shown in FIG. 5.

The transmission path of optical signals in the accelerometer chip is as follows: the input optical signals are single-polarization laser signals, fed into the asymmetric Mach-Zehnder interferometer 2 through the input waveguide 1, and split into two beams of optical signals with different power by the first 2×2-port directional coupler 6; the two beams enter into the short waveguide 71 and the long curved waveguide 8 respectively, output from the output end of the second 2×2-port directional coupler 10, and split into two beams of optical signals again, which then enter into the short curved waveguide 4 and the output waveguide 5 respectively. The optical signals entering into the short curved waveguide 4 produce multi-beam interference in the closed optical resonant cavity formed by the asymmetric Mach-Zehnder interferometer 2 and short curved waveguide 4, and finally form stable output optical signals. The output optical signals pass through the output waveguide 5 and enter into an optical detector, and are demodulated in a photoelectric conversion circuit (not indicated in the drawing) and converted into electric signals, from which the acceleration is detected.

Figure 6:
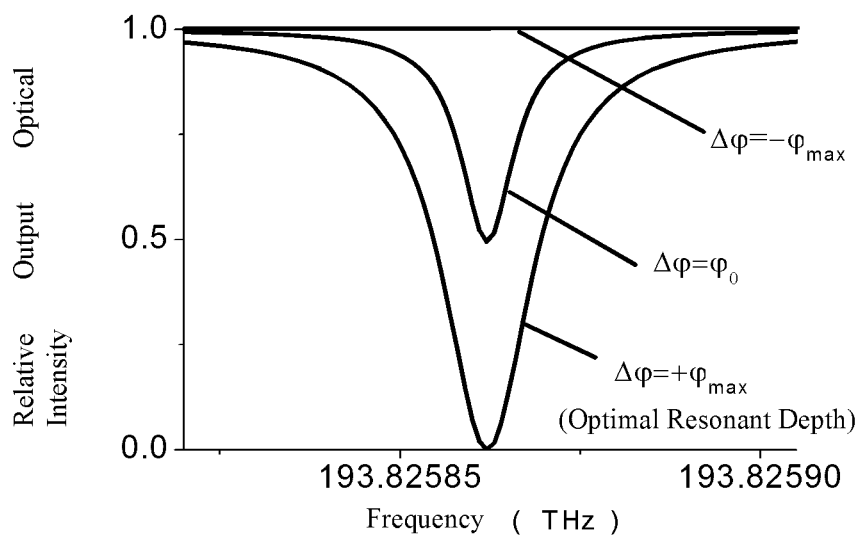
FIG. 6 is a schematic diagram of output spectral curves corresponding to different phase differences resulting from acceleration.

The relative optical intensity of the output signals of the output waveguide 5 can be expressed by formula (1):

$$|E_7/E_1|^2 = (1-r_0)\left[1 - \frac{K(1-K-A)/(1-K)}{1+A-2A^{1/2}\cos(\beta L + \varphi_{82})}\right] \quad (1)$$

$$A = (1-K)(1-r_0)\exp(-2\alpha L) \quad (2)$$

$$K = 4(1-k)k\cos^2\left(\frac{\Delta\varphi}{2}\right) \quad (3)$$

wherein, $\Delta\phi$ is the optical phase difference between the two arms of the asymmetric Mach-Zehnder interferometer 2, k is the coupling ratio of the first 2×2-port directional coupler 6 to the second 2×2-port directional coupler 10, $r_0$ is the insertion loss of the asymmetric Mach-Zehnder interferometer 2, α is the waveguide transmission loss of the resonant cavity, and L is the length of the resonant cavity. FIG. 6 shows the output spectral curves of the chip corresponding to different phase differences $\Delta\phi$.

When the system acceleration is zero, the optical signals have a stable initial phase when they pass through the long curved waveguide 8. When the system acceleration is not zero, the inertial force produced by the mass block 17 is applied evenly on the micro-cantilever beam 16; thus, the micro-cantilever beam 16 has certain elastic bending and suffers internal stress and strain, resulting in the change of effective refractive index of the optical waveguide; and as a result, the transmission phase in the long curved waveguide 8 changes, resulting in change of phase difference $\Delta\phi$. It can be seen from formulae (1)-(3) that, in the dynamic range, the phase difference $\Delta\phi$ resulting from acceleration is in linear relationship with the output optical intensity at the resonant frequency.

The design of structural parameters of the accelerometer provided in the present invention is implemented as follows: due to the fact that organic polymer materials have a negative thermo-optical coefficient and a positive thermal expansion coefficient, appropriate organic polymer material and waveguide structure can be selected to obtain the optical waveguides that are insensitive to temperature fluctuations. This principle is well-known in the art and therefore will not be detailed here. The optical waveguide devices and micro mechanical vibration cantilever beam 3 can be produced with optical waveguides that are insensitive to temperature fluctuations and the technology described above, so as to eliminate the detection noise resulting from environmental temperature fluctuations. The coupling ratio k of the first 2×2-port directional coupler 6 to the second 2×2-port directional coupler 10 is designed as 0.1, to ensure that the resonant frequency drift of the resonant cavity is negligible when the phase difference $\Delta\phi$ is changed as a result of the acceleration. By designing the structural parameters of the micro mechanical vibration cantilever beam 3, including waveguide width and thickness, and substrate width and thickness, the detection sensitivity and dynamic range of the accelerometer can be adjusted within a wide range, so as to meet different testing demands.

Figure 7:
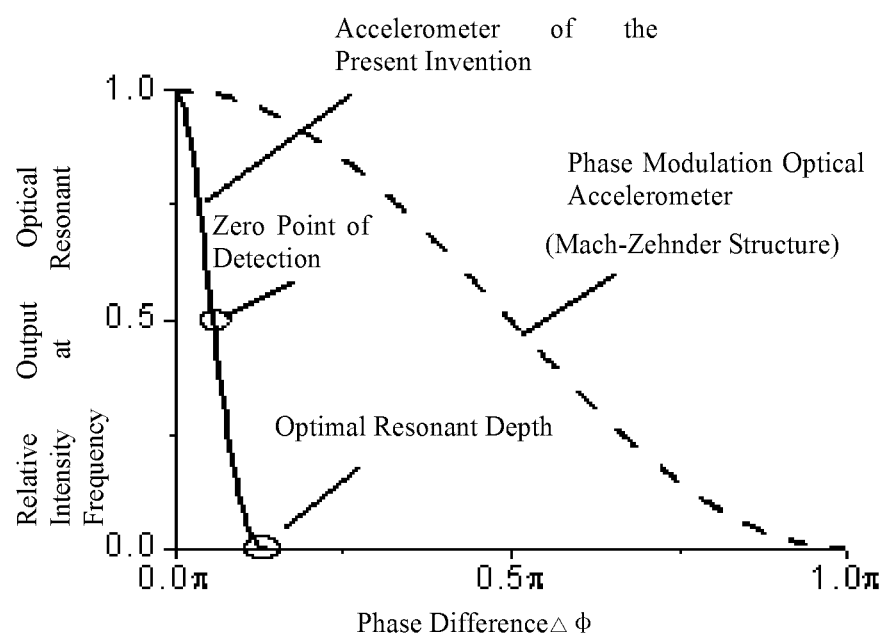
FIG. 7 is a comparative diagram of detection sensitivity between different accelerometers.

The testing process of the accelerometer provided in the present invention is implemented as follows: first, the frequency of the input optical signals is modulated to the resonant frequency, and then the phase modulator 9 is adjusted to set the initial phase difference between the two arms of the asymmetric Mach-Zehnder interferometer 2 at the zero point of detection (as shown in FIG. 7). When the relative optical intensity at the output end is 0.5, the point is the zero point of detection, at which the acceleration detection sensitivity is the highest. The core layer of the long curved waveguide 8 is above the neutral plane 15 of cantilever beam, thus when the micro mechanical vibration cantilever beam 3 is bent downwards under the inertial force resulting from acceleration, the optical waveguide extends; otherwise, the optical waveguide retracts. The phase difference $\Delta\phi 0$ varies within $\pm\phi_{max}$. Therefore, the accelerometer can measure the magnitude and direction of acceleration at the same time.

In terms of the detection principle, compared to the prior art, including phase modulation optical accelerometers and frequency modulation optical accelerometers:

1. Under the condition of same elastic modulus of material and the same phase difference of cantilever beams resulting from acceleration, the detection sensitivity of the accelerometer provided in the present invention is several times higher than the detection sensitivity of conventional phase modulation optical accelerometers (Mach-Zehnder structure), as shown in FIG. 7.

2. Conventional frequency modulation optical accelerometers obtain the value of acceleration by measuring the horizontal displacement at the resonant frequency. Since the optical signals are not always at the resonant frequency in these optical accelerometers, the resonant spectral lines must be fully symmetric so as to ensure accuracy. However, due to the environmental temperature fluctuations and the double refraction of waveguide, the resonant spectral lines have horizontal displacement and asymmetrical distribution, which result in severe degradation of detection sensitivity of the device. In contrast, in the accelerometer provided in the present invention, the optical signals are always at the resonant frequency during the testing process. Since the detection noise is the lowest at the resonant frequency and the accelerometer is not affected by the environmental temperature fluctuations and the double refraction of waveguide, the accelerometer always has high sensitivity and high stability.

The invention claimed is:

1. A cantilever beam structural resonant-type integrated optical waveguide accelerometer, comprising input waveguide (1), asymmetric Mach-Zehnder interferometer (2), micro mechanical vibration cantilever beam (3), short curved waveguide (4), and output waveguide (5), characterized in that:

the input waveguide (1), the asymmetric Mach-Zehnder interferometer (2), the micro mechanical vibration cantilever beam (3), the short curved waveguide (4), and the output waveguide (5) all comprise organic polymer substrate (12), organic polymer waveguide core layer (13), and organic polymer waveguide cladding (14);

the inner ends of a first 2×2-port directional coupler (6) are respectively connected to a first short waveguide (71) and one end of the curved waveguide (4), the inner ends of a second 2×2-port directional coupler (10) are respectively connected to a second short waveguide (72) and the other end of the curved waveguide (4), and a phase modulator (9) is connected between the first short waveguide (71) and the second short waveguide (72), forming an asymmetric Mach-Zehnder interferometer (2);

the input waveguide (1), the short curved waveguide (4), the output waveguide (5), the first 2×2-port directional coupler (6), the first short waveguide (71), the phase modulator (9), the second short waveguide (72), and the second 2×2-port directional coupler (10) are all fixed on a base 11;

the outer ends of the first 2×2-port directional coupler (6) are respectively connected to the input waveguide (1) and one end of the long curved waveguide (8), the outer ends of the second 2×2-port directional coupler (10) are respectively connected to the output waveguide (5) and the other end of the long curved waveguide (8), the long curved waveguide (8) is integrated on the micro mechanical vibration cantilever beam (3);

the micro mechanical vibration cantilever beam (3) has a twin-beam structure, which is formed through the connection between two parallel and symmetrically distributed micro-cantilever beams (16) and a mass block (17); one end of the micro-cantilever beams (16) is fixed on the base (11), and the other end of the micro-cantilever beams (16) is connected with the mass block (17); the mass block (17) is hung freely in the air.

2. The cantilever beam structural resonant-type integrated optical waveguide accelerometer according to claim 1, characterized in that, in the micro-cantilever beams (16), the organic polymer waveguide cladding (14) is on the organic polymer substrate (12), and the organic polymer waveguide core layer (13) is in the organic polymer waveguide cladding (14), wherein, the organic polymer waveguide core layer (13) has a rectangular structure with thickness and width at micron level; the organic polymer waveguide cladding (14) and the organic polymer substrate (12) has same width of 20-1,000 µm; the organic polymer waveguide cladding (14) has a thickness of 10-20 µm, and the organic polymer substrate (12) has a thickness of 20-1,000 µm.

3. The cantilever beam structural resonant-type integrated optical waveguide accelerometer according to claim 1, characterized in that, the optical signals are fed through the input waveguide (1) into a closed optical circuit composed of the asymmetric Mach-Zehnder interferometer (2) and short curved waveguide (4), and produce multi-beam interfered optical signals; the interfered optical signals are output by the output waveguide (5) to an optical detector and a peripheral detecting circuit, the optical signals are demodulated by the peripheral detecting circuit, the acceleration is detected by measuring the change of optical intensity at the resonant frequency and the phase difference of optical signals resulting from acceleration.

* * * * *